United States Patent
Karnalkar et al.

(10) Patent No.: US 8,565,821 B2
(45) Date of Patent: *Oct. 22, 2013

(54) METHOD AND APPARATUS FOR PRESENTING A USER INTERFACE

(71) Applicant: AT&T Intellectual Property I, LP, Atlanta, GA (US)

(72) Inventors: Anup D. Karnalkar, Allen, TX (US); R. Tyler Wallis, Dallas, TX (US); William S. Robbins, Sun Prarie, WI (US); Susan Steele, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,663

(22) Filed: Oct. 17, 2012

(65) Prior Publication Data

US 2013/0040704 A1 Feb. 14, 2013

Related U.S. Application Data

(63) Continuation of application No. 13/416,750, filed on Mar. 9, 2012, now Pat. No. 8,315,667, which is a continuation of application No. 12/330,415, filed on Dec. 8, 2008, now Pat. No. 8,150,463.

(51) Int. Cl.
*H04W 88/02* (2009.01)

(52) U.S. Cl.
USPC .......................................................... 455/557

(58) Field of Classification Search
USPC .......... 455/557; 715/255, 702, 765, 744, 800, 715/810, 853; 707/769
See application file for complete search history.

(56) References Cited

U.S. PATENT DOCUMENTS

| | | | |
|---|---|---|---|
| 6,112,141 A | 8/2000 | Briffe et al. | |
| 6,643,124 B1 | 11/2003 | Wilk | |
| 6,947,067 B2 | 9/2005 | Halttunen | |
| 7,761,800 B2 | 7/2010 | Chaudhri et al. | |
| 2001/0055954 A1 | 12/2001 | Cheng | |
| 2004/0233238 A1* | 11/2004 | Lahdesmaki | 345/810 |
| 2005/0064853 A1 | 3/2005 | Radpour | |
| 2008/0165153 A1 | 7/2008 | Platzer | |
| 2009/0064020 A1* | 3/2009 | Morris | 715/765 |
| 2009/0132383 A1 | 5/2009 | Piepenbrink et al. | |
| 2010/0058255 A1 | 3/2010 | Stefanik et al. | |
| 2011/0143723 A1 | 6/2011 | Shaw et al. | |
| 2012/0005605 A1* | 1/2012 | White et al. | 715/765 |

* cited by examiner

*Primary Examiner* — Diane Mizrahi

(74) *Attorney, Agent, or Firm* — Guntin & Gust, PLC; Andrew Gust

(57) ABSTRACT

A system that incorporates teachings of the present disclosure may include, for example, utilizing a first communication device for identifying a user interface adaptation according to operating characteristics of a second display of a second communication device, identifying first and second user interface portions according to the user interface adaptation, presenting the first user interface portion at a first display of the first communication device, transmitting the second user interface portion to the second communication device for presentation at the second display of the second communication device, and enabling user interface navigation that includes the first and second user interface portions as a single user interface based on user inputs received at the first communication device. Other embodiments are disclosed.

20 Claims, 8 Drawing Sheets

US 8,565,821 B2

METHOD AND APPARATUS FOR PRESENTING A USER INTERFACE

CROSS-REFERENCE TO RELATED APPLICATIONS

This application is a continuation of and claims priority to U.S. patent application Ser. No. 13/416,750, filed Mar. 9, 2012, which is a continuation of U.S. Pat. No. 8,150,463 filed Dec. 8, 2008, the disclosures of all of which are incorporated herein by reference in their entirety.

FIELD OF THE DISCLOSURE

The present disclosure relates generally to user interface techniques and more specifically to a method and apparatus for presenting a user interface.

BACKGROUND

Communication devices such as cordless phones, cellular phones and laptop computers come with a display for presenting a graphical user interface (GUI). The GUI can be accompanied by an input device such as a keypad and navigation system for manipulating functions of the communication device. Typically, the displays used by cordless and cellular phones are limited in size. As a result, the set of features available with these devices can sometimes be limited or nested due to the size of the display and its resolution.

DETAILED DESCRIPTION

One embodiment of the present disclosure can entail a device having a tablet with a touch-sensitive display. A base unit can be communicatively couplable to the tablet by way of a cordless phone protocol and a wireless data protocol to provide voice and data communication services to the tablet. The tablet can be adapted to detect a presence of another communication device with a display, determine operating characteristics of the display, create according to the operating characteristics of the display a first user interface (UI) portion to be presented by the display of the other communication device and a second UI portion to be presented by the touch-sensitive display of the tablet, transmit the first UI portion by way of the base unit using the wireless data protocol for presentation at the display of the other communication device, present the second UI portion at the touch-sensitive display of the tablet, and navigate between the first and second UI portions as a single UI of the tablet.

Another embodiment of the present disclosure can entail a computer-readable storage medium operating in a cordless phone having computer instructions to detect another communication device with a display, create according to one or more operating characteristics of the display a first UI portion to be presented by the display of the other communication device and a second UI portion to be presented by a display of the cordless phone, transmit the first UI portion for presentation at the display of the other communication device, present the second UI portion at the display of the cordless phone, and navigate between the first and second UI portions as a single UI.

Yet another embodiment of the present disclosure can entail a cordless phone creating first and second UI portions according to operating characteristics of a display of another communication device, transmitting the first UI portion for presentation at the display of the other communication device, presenting the second UI portion at a display of the cordless phone, and navigating between the first and second UI portions as one UI.

Figure 1:
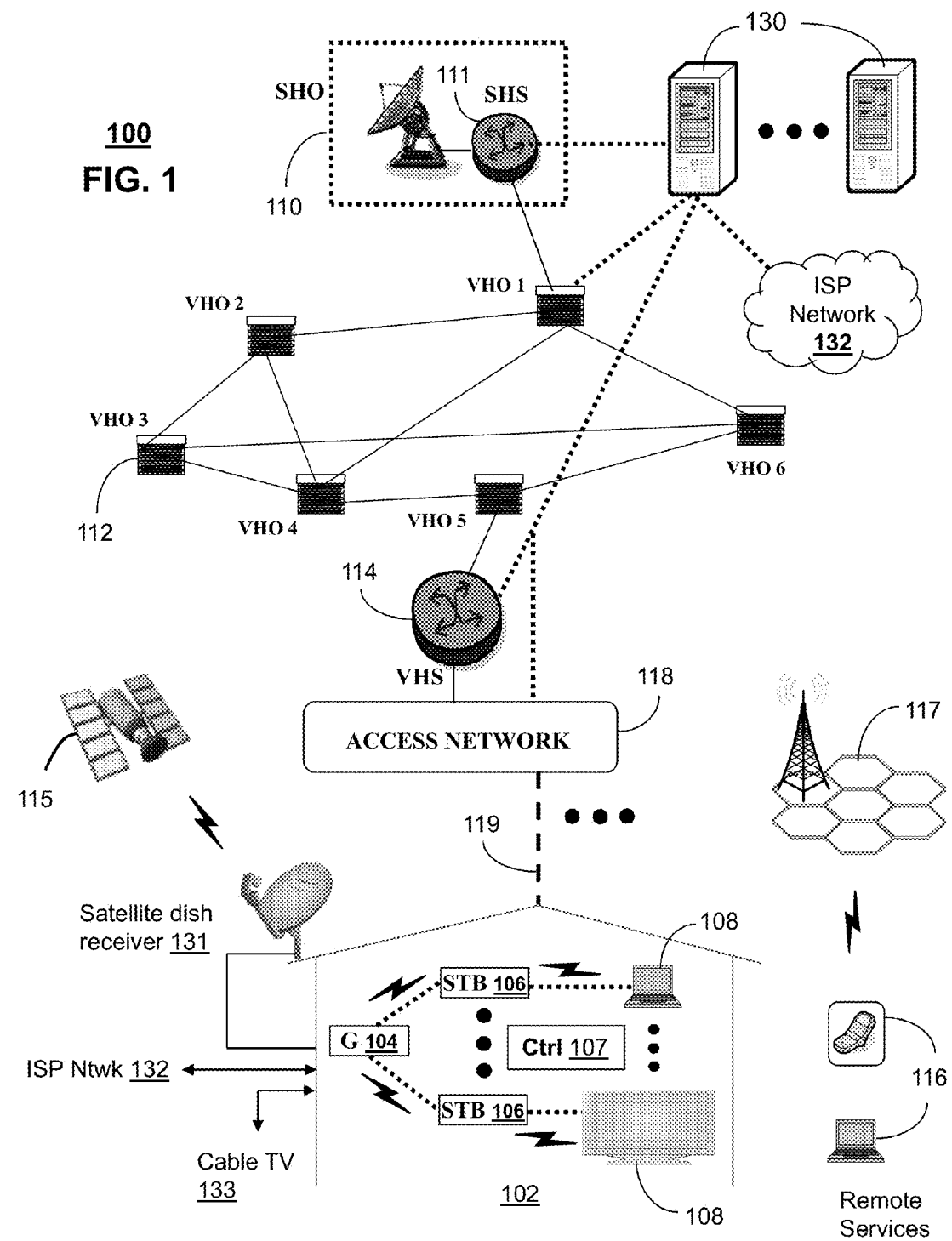
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the one or more computing devices 130 can be used as a user interface (UI) adaptation system 130 (herein referred to as UI adaptation system 130) for storing and managing UI adaptations for a plurality of communication devices operating in communication system 100. The UI adaptation system 130 will be further described in the method of FIG. 5.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
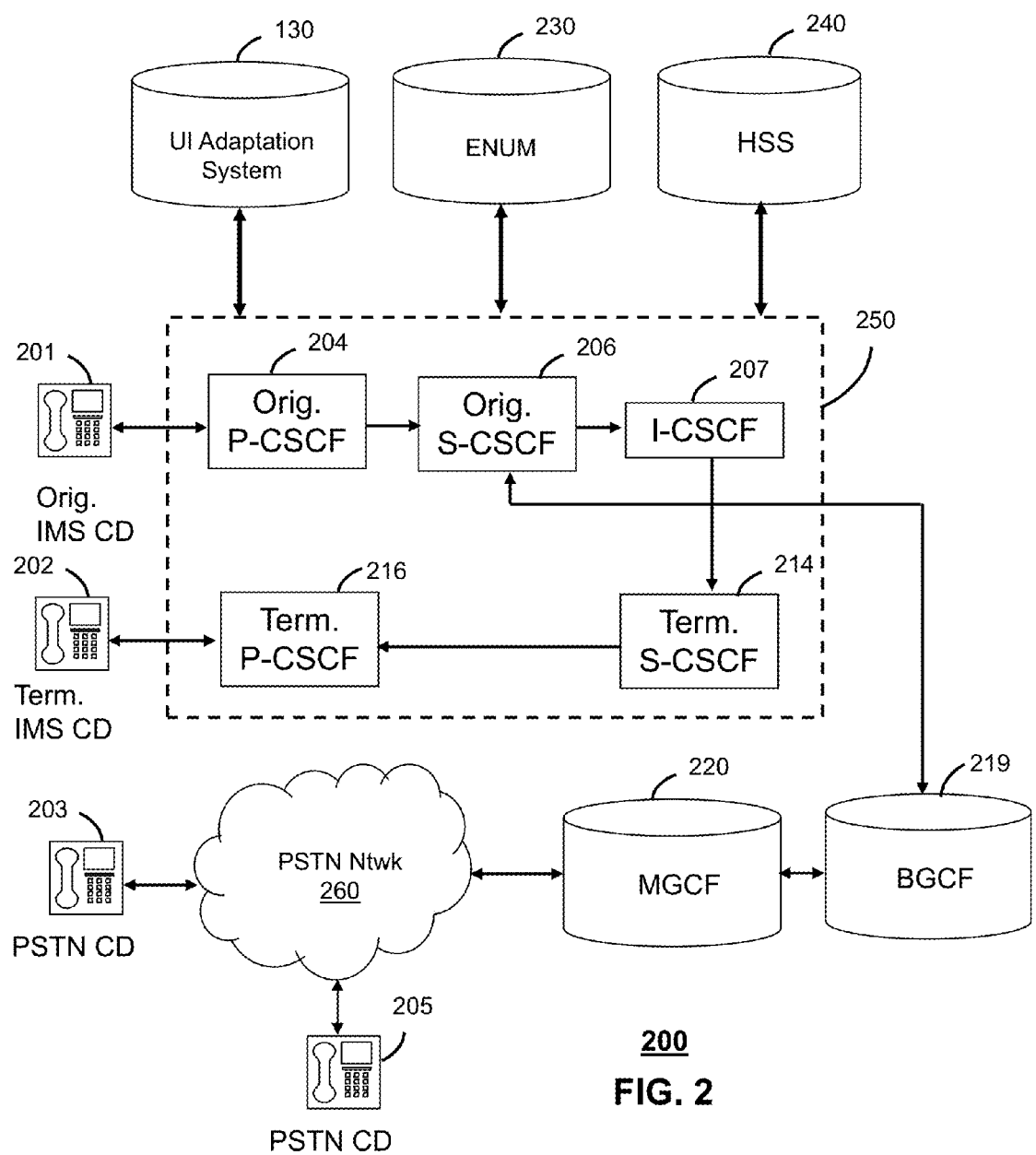

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The UI adaptation system 130 of FIG. 1 can be operably coupled to the second communication system 200 for purposes similar to those described above.

Figure 3:
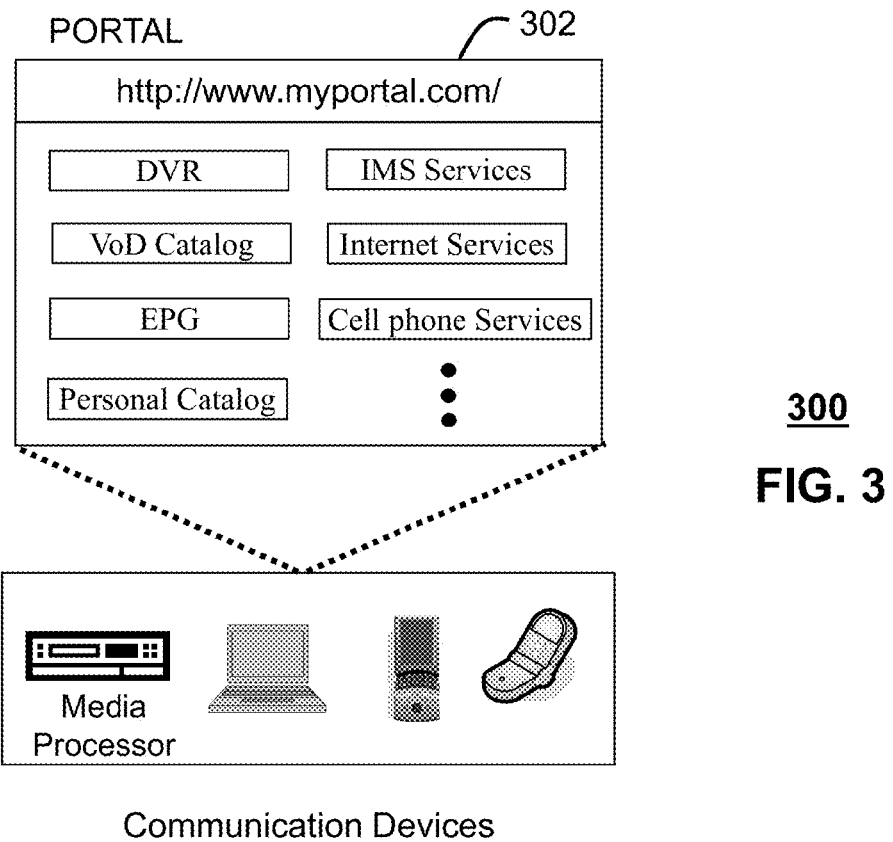
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
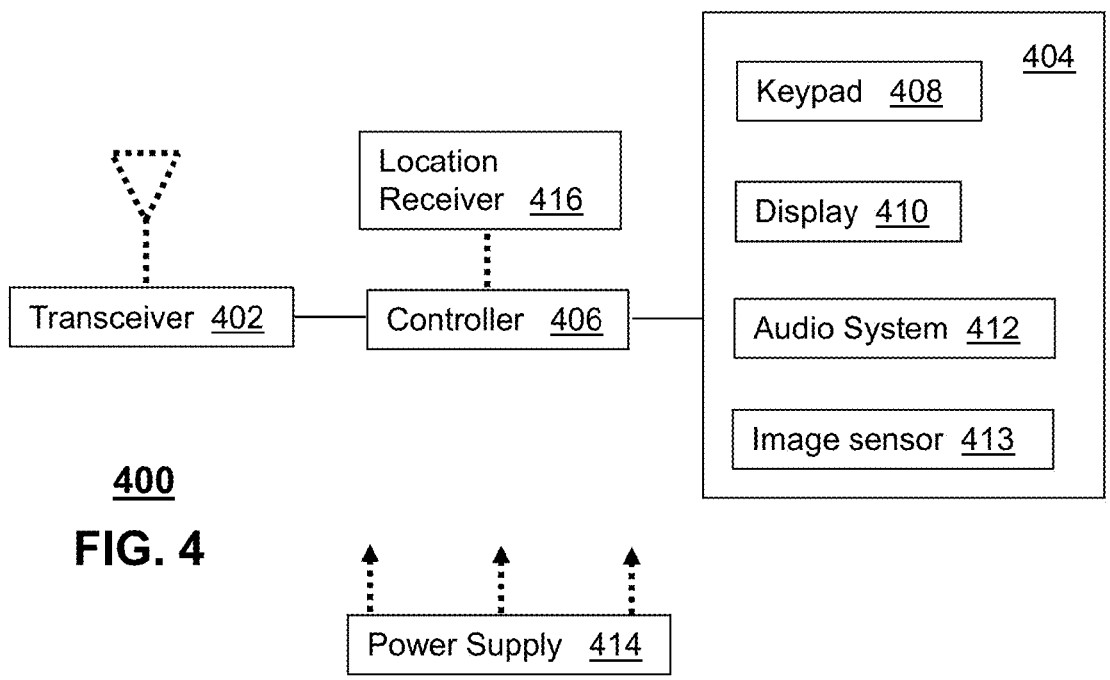
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
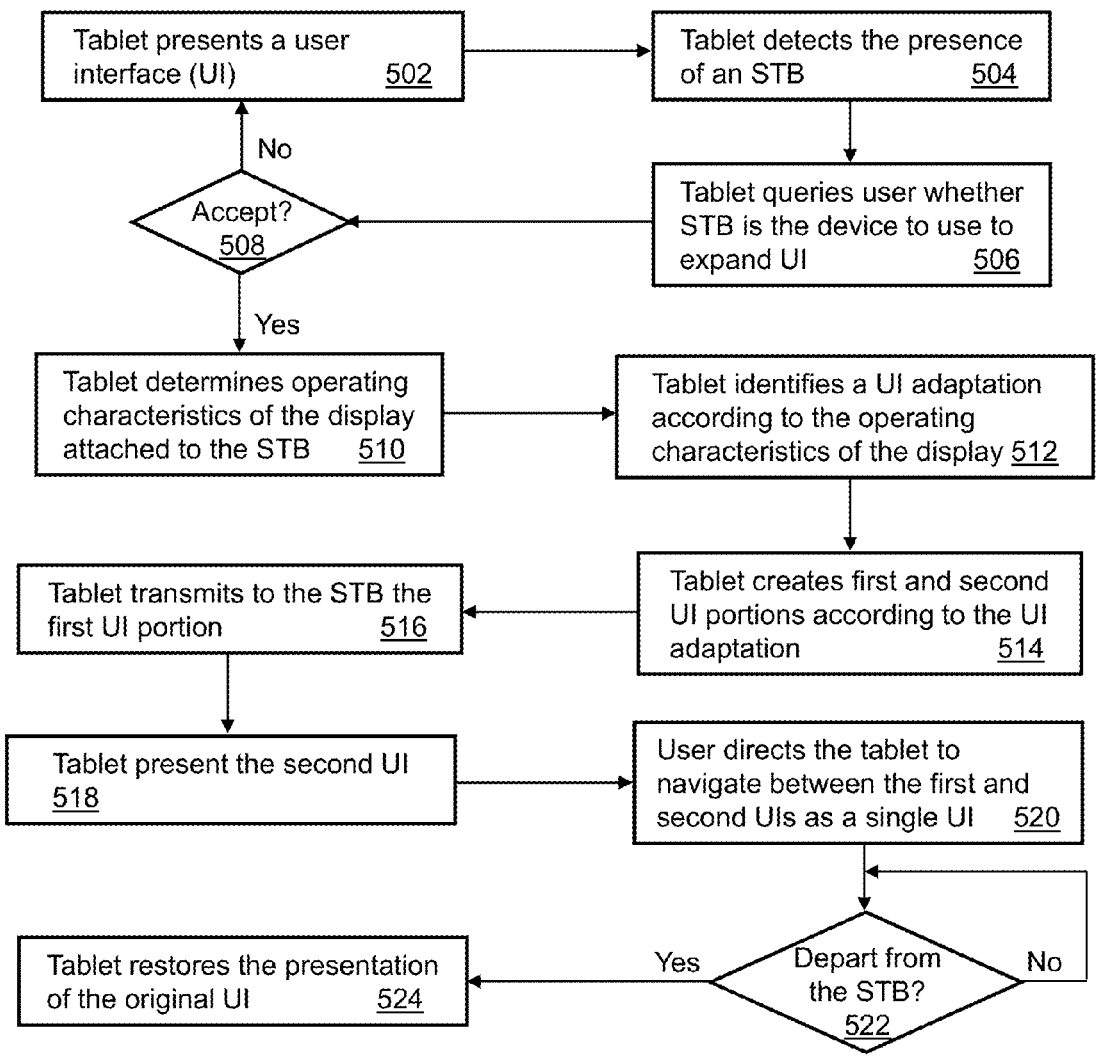
FIG. 5 depicts an illustrative embodiment of a method according to the present disclosure.
Figure 6:
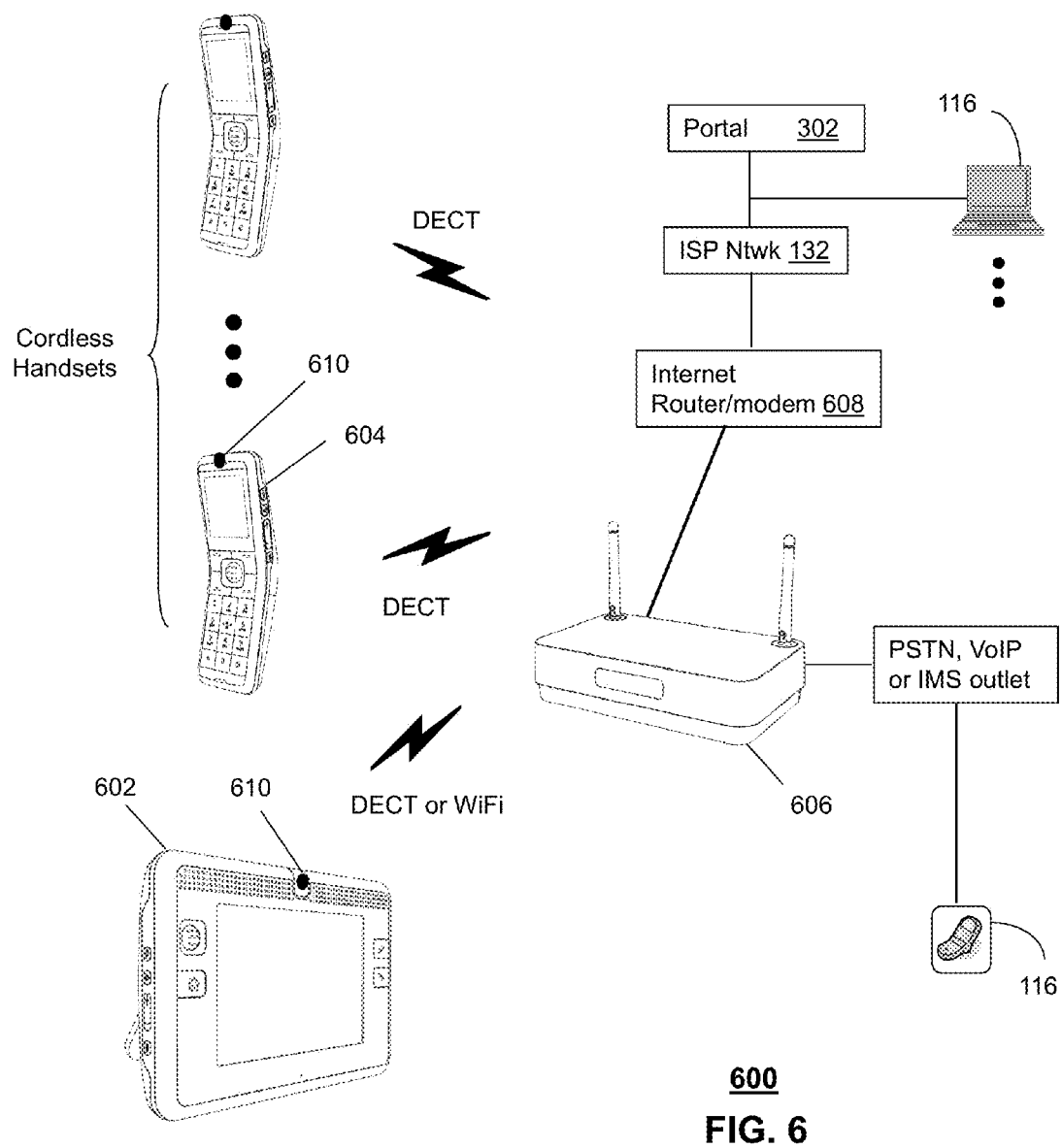
FIGS. 6-8 depict illustrative embodiments of the method of FIG. 5.

FIG. 5 depicts an illustrative method 500 for managing tasks. FIG. 6 shows an illustrative embodiment of a block diagram 600 of communication devices operating according to method 500. Block diagram 600 comprises a communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can also be coupled to an Internet/router modem 608 for communicatively interfacing to the portal 302, a computer 116 or other communication devices accessible by way of the ISP network 132 of FIG. 1. The base unit 606 can provide the cordless handsets voice communication services, and the tablet 602 a combination of voice and data communication services. The tablet 602 and cordless handsets 604 can be equipped with common camera sensors 610 (such as charged coupled device sensors) which can enable these devices to support video communication services.

Figure 7:
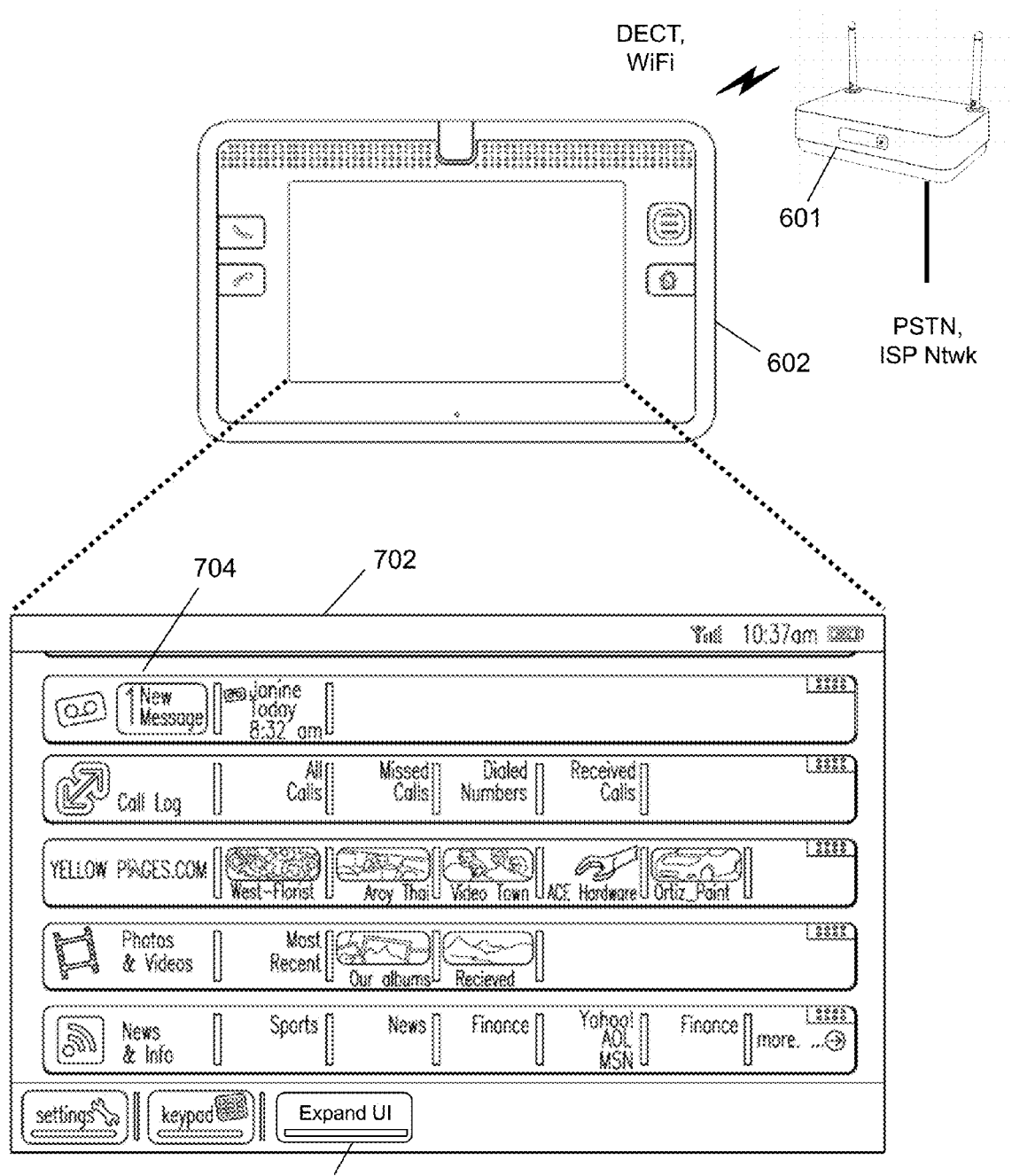

With the configuration of FIG. 6 in mind, method 500 can begin with step 502 in which the tablet 602 presents a user a user interface (UI) 702 such as shown in the illustration of FIG. 7. UI 702 can include a plurality of selectable tool bars 704 which represent different features of the tablet 602 (e.g., email, call logs, yellow pages browsing, and so on). In step 504, the tablet 602 can detect the presence of an STB 106. This step can be the result of the user indicating to the tablet 602 by way of depressing button 706 a desire to expand the UI with a display of another communication device in the vicinity of the tablet. In response to this step, the tablet 602 can utilize its WiFi communication resources to determine which other communication devices are on the WiFi network. This information can be provided by the base unit 601 or by common WiFi sniffing techniques. In response to detecting that the STB 106 is on the WiFi network, it can prompt the user in step 506 for an acknowledgment that this is the communication device which the user would like to use to expand the footprint of the UI 702 of FIG. 7.

It would be appreciated that the tablet 602 can also be programmed to automatically scan the WiFi network for other communication devices having a display which can be used to expand the UI capabilities of the tablet. When other communication devices such as the STB are detected, the tablet 602 can promptly respond to the depression of the expand UI button 706 with the query of step 506.

Figure 8:
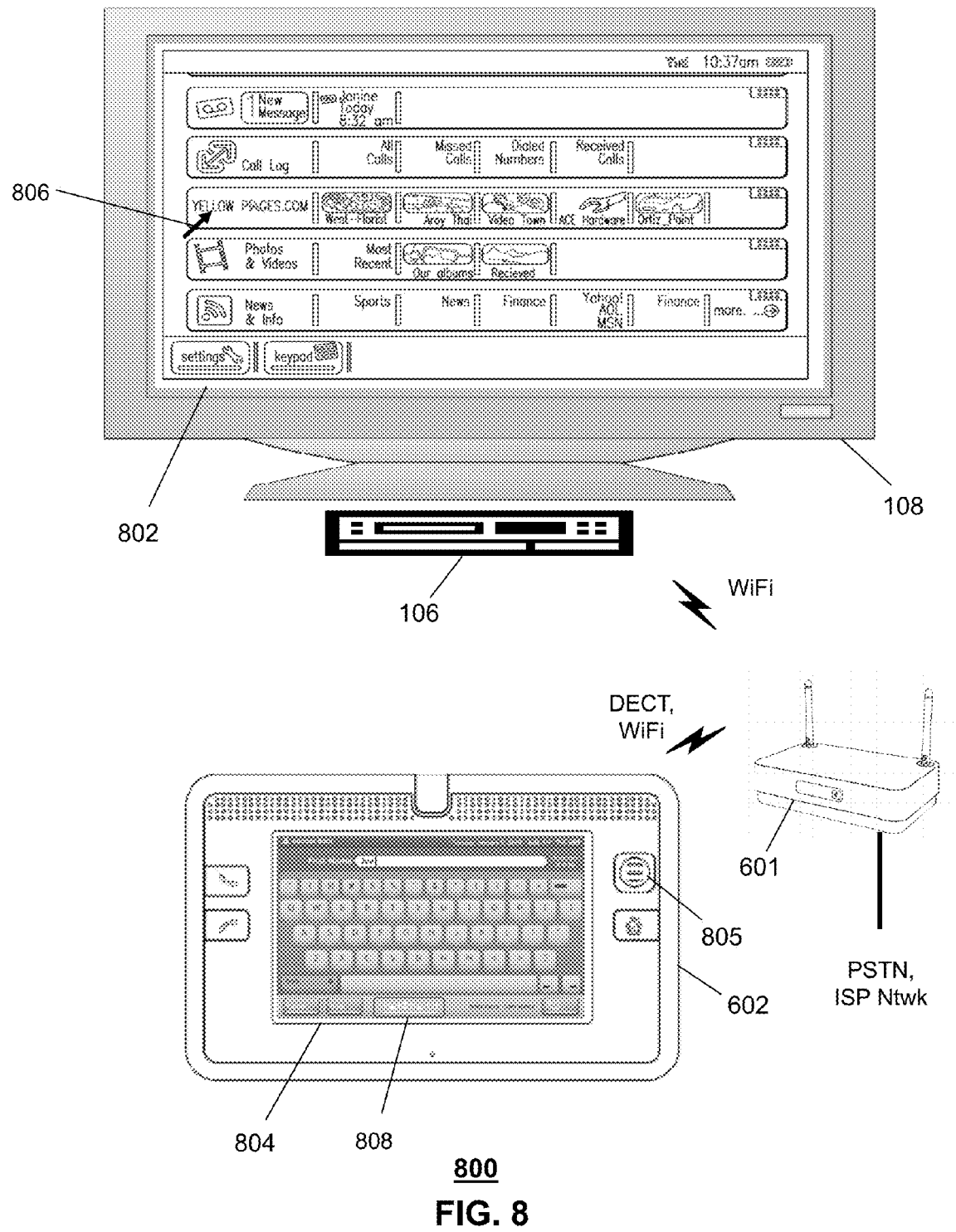

When the user accepts in step 508 a selection of the STB 106 from the query presented in step 506 by way of a derivative of UI 702, the tablet 602 proceeds to step 510. When the user rejects the STB 106 and/or any other devices presented in the query of step 506, the tablet 602 can be programmed to return to step 502 where it continues to present the UI 702 of FIG. 7. In step 510, the tablet 602 can be programmed to determine the operating characteristics of the display 108 coupled to the STB 106 shown in FIG. 8. The operating characteristics can include display size, pixel resolution, color resolution, frame rate, contrast capability, or any other suitable metric which can prove useful in adapting the UI 702 to a larger footprint.

In one embodiment, the operating characteristics of the display 108 can be transmitted by the STB 106 to the tablet 602 by way of the base unit 601. In another embodiment, the tablet 602 can receive from the STB 106 a model and/or serial number of the vendor of the display 108 to determine the operating characteristics by way of a third-party vendor (such as the manufacturer of the display accessible by way of the ISP network 132) or by way of the UI adaptation system 130. Other methods for determining the operating characteristics of the display 108 are contemplated by the present disclosure.

Once the operating characteristics of the display 108 are determined, the tablet 602 can proceed to step 512 where it identifies a UI adaptation technique according to the operating characteristics of the display. The UI adaptation technique can instruct the tablet 602 in step 514 how to create first and second UI portions to adapt the tablet 602 to a two display set-up. Once the first and second UIs have been created, the tablet 602 can transmit to the STB 106 in step 516 the UI 802 to be presented on the display 108, and in step 518 the tablet can present the other UI portion 804 on its display. The user of tablet 602 can then navigate in step 520 between the first and second UIs 802, 804 as a single UI with an expanded footprint. The user can navigate a pointer 806 within the first UI 802 presented by the display 108 using the navigation function 805, or enter alphanumeric data by manipulating the Qwerty keyboard presented by the second UI 804.

The instructions provided in the UI adaptation technique can identify structural features of the UIs 802, 804 to be presented in each display. The structural features can be described by GUI templates supplied by the UI adaptation system 130 in step 512 for presentation at the display 108 and the display of tablet 602, respectively. The GUI templates can have a look and feel that can be similar or different from the UI 702. The UI adaptation technique can also identify additional operating features of the tablet 602 to be displayed in the first and second UIs 802, 804, which were not present in the UI 702 when the tablet was operating independent of the STB 106 and display 108 combination.

The UI adaptation system 130 can utilize a common database that stores a list of possible third party display vendors and corresponding adaptation techniques to be used by the tablet 602. The database of the UI adaptation system 130 can be indexed by the operating characteristics or a model and/or serial number of the display supplied by the STB 106, which the tablet 602 can convey to the UI adaptation system by way of the ISP network 132. The UI adaptations stored in UI adaptation system 130 can be created by the service provider of the tablet 602 to adapt the operating features of the tablet to a larger display footprint of a particular display device.

Depending on the size of the display 108 coupled to the STB 106, the UI adaptation process used by the tablet 602 can result in the presentation of operating features not previously shown by the UI 702. Features of the tablet 602 that are commonly nested in several layers of the UI 702 can be brought to a top layer when using the display 108 of FIG. 8. For instance, it can be customary for the tablet 602 to be programmed to present UI 702 with taskbars without a Qwerty keyboard due to a lack of display area. However, with the split display set-up of FIG. 8, the tablet 602 can be directed according to the UI adaptation technique supplied by the UI adaptation system 130 to present a Qwerty keyboard 804 on the display of the tablet, and the taskbars on the display 108. Accordingly, the expanded UI footprint provides the user a more convenient means to manipulate the UI of the tablet 602 which would otherwise take additional steps when the tablet is operating independently.

In step 522, the tablet 602 can also be programmed to detect a departure from the STB 106. This step can be detected by the user depressing the "Restore UI" button 808 on the display of the tablet 602. When this button is depressed, the tablet 602 can automatically restore in step 524 UI 702 as illustrated in FIG. 7.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that the STB 106 provides the tablet 602 a subset of the area available on the display 108. The subset can be defined by a given dimension and coordinate supplied by the STB 106. In this manner, the STB 106 can reserve a portion of the display 108 for other presentations such as a TV program. Additionally, method 500 can be adapted so that it can be applied to the handsets 604 to expand their UI footprint as well. Generally speaking, method 500 can be used by any pair of communication devices that can make use of an expandable UI.

In yet another embodiment, the functions of the UI adaptation system 130 can be integrated in the communication device performing the UI expansion process. In this embodiment, step 512 can be executed by the tablet 602 by retrieving the UI adaptation technique from its own memory according to the operating characteristics determined in step 510.

Other suitable modifications can be applied to the present disclosure without departing from the scope of the claims below. Accordingly, the reader is directed to the claims section for a fuller understanding of the breadth and scope of the present disclosure.

Figure 9:
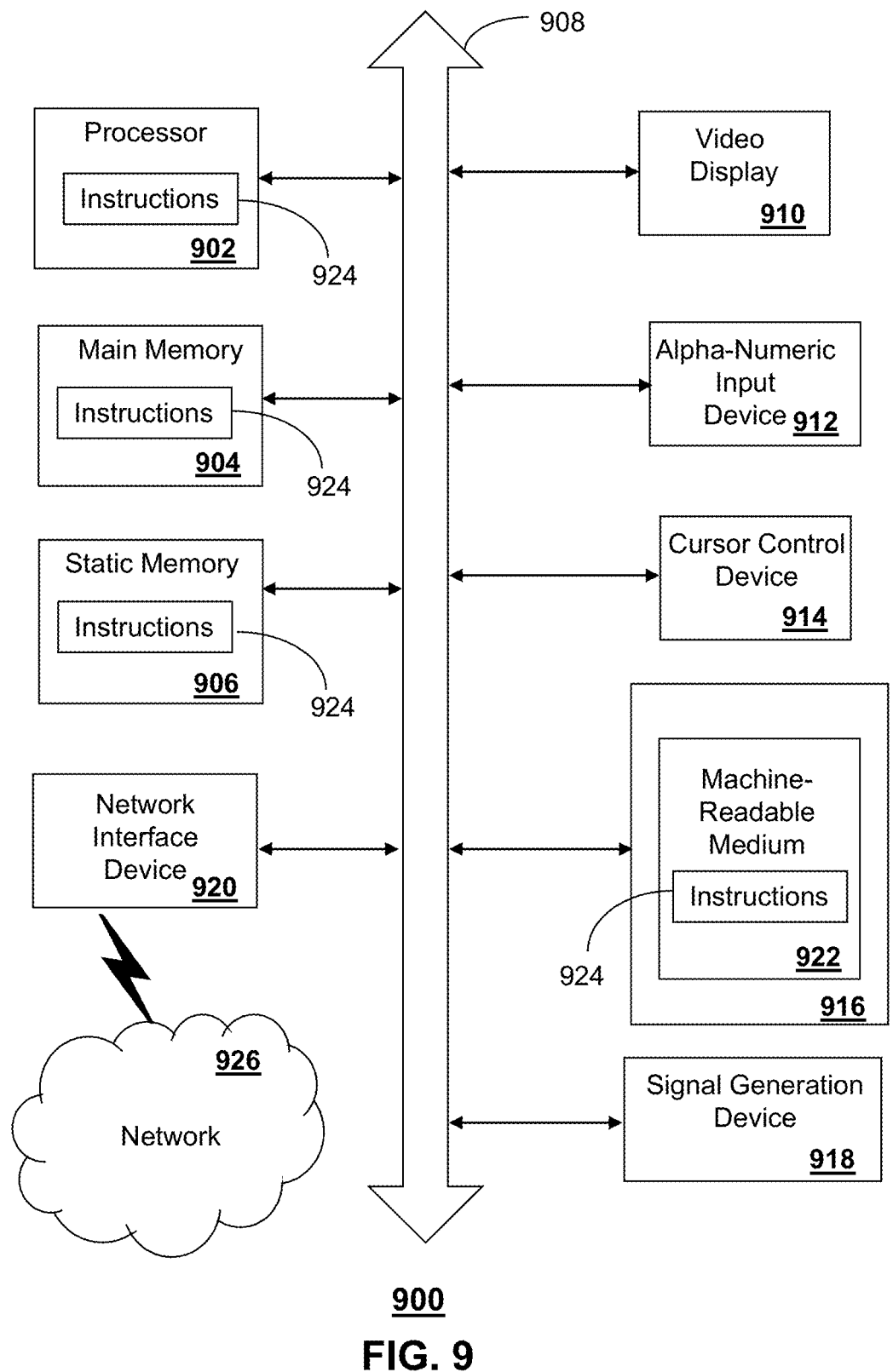
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a memory to store computer instructions;
   a first display; and
   a controller circuit coupled to the memory and the first display, wherein the controller circuit is programmed for communications with a base unit by way of a cordless phone protocol and a wireless data protocol to provide voice and data communication services, and wherein the controller circuit, responsive to executing the computer instructions, performs operations comprising:
   determining operating characteristics of a second display in communication with a set top box, wherein the operating characteristics comprise a frame rate;
   receiving restriction information from the set top box, wherein the restriction information designates areas of the second display that are permitted to present a user interface;
   receiving a user interface template over a network from a remote system;
   generating a first user interface portion to be presented on the first display and generating a second user interface portion to be presented on the second display of the set top box, wherein the second user interface portion is generated based on the operating characteristics of the second display, based on the user interface template, and based on the restriction information that designates the areas of the second display that can present the second user interface portion;
   presenting the first user interface portion at the first display;
   transmitting the second user interface portion by way of the base unit using the wireless data protocol for presentation at the second display of the set top box;
   providing navigation between the first and second user interface portions as a single user interface based on user inputs;
   detecting a departure from a presence of the set top box; and
   restoring a presentation of an original user interface presented on the first display responsive to a restoration request.

2. The device of claim 1, wherein the network comprises an internet protocol television communication system.

3. The device of claim 1, wherein the user inputs are received at the controller circuit, and wherein the restoration request is based on the user inputs.

4. The device of claim 1, wherein the controller circuit, responsive to executing the computer instructions, performs an operation comprising detecting the presence of the set top box, wherein the presentation of the original user interface is restored responsive to detecting that the controller circuit is not communicatively coupled to the set top box.

5. The device of claim 1, wherein the operating characteristics of the second display are determined by providing display identification information associated with the second display to the remote system and by receiving the operating characteristics from the remote system.

6. The device of claim 1, wherein the data communications protocol corresponds to a wireless fidelity protocol.

7. The device of claim 1, wherein the base unit is in communication with an internet protocol television communication system.

8. The device of claim 1, wherein the cordless phone protocol corresponds to a digital enhanced cordless telecommunications protocol.

9. The device of claim 1, wherein the first user interface portion includes a view supplied by a webcam.

10. The device of claim 1, wherein the base unit is in communication with an internet protocol multimedia subsystem communication system.

11. A media receiver, comprising:
a memory to store computer instructions; and
a controller circuit coupled to the memory, wherein the controller circuit, responsive to executing the computer instructions, performs operations comprising:
providing operating characteristics to a communication device, wherein the operating characteristics are associated with presentation of content by a second display in communication with the media receiver, wherein the controller circuit communicates with the communication device via a base unit that utilizes a cordless phone protocol and a wireless data protocol to provide voice and data communications to the communication device;
providing the communication device with display information that defines areas of the second display that can present the second user interface portion
receiving from the communication device a second user interface portion generated by the communication device based on the operating characteristics for presentation on the second display; and
presenting the second user interface portion at the second display, wherein the presentation of the second user interface portion is in conjunction with presentation of a first user interface portion at a first display of the communication device, wherein the first and second user interface portions are presented as a single user interface and enable user interface navigation utilizing user inputs received at the communication device, wherein a presentation of an original user interface presented on the first display is restored responsive to a determination that the controller circuit is not communicatively coupled to the communication device.

12. The media receiver of claim 11, wherein the first user interface portion includes a view supplied by a webcam.

13. The media receiver of claim 11, wherein the base unit is in communication with an internet protocol multimedia subsystem communication system.

14. A method, comprising:
identifying, by a first communication device, a user interface adaptation according to operating characteristics of a second display of a second communication device;
receiving, by the first communication device, a user interface template from a remote system;
identifying first and second user interface portions according to the user interface adaptation;
presenting, by the first communication device, the first user interface portion at a first display coupled with the first communication device;
receiving from the second communication device operating information for limiting a presentation of the second user interface portion to a subset of an area of the second display, wherein the second user interface portion is generated based on the operating information and based on the user interface template;
transmitting, by the first communication device, the second user interface portion to the second communication device for presentation at the second display of the second communication device; and
enabling user interface navigation that includes the first and second user interface portions as a single user interface based on user inputs received at the first communication device.

15. The method of claim 14, wherein the second communication device is a set top box.

16. The method of claim 14, wherein the first communication device communicates with the second communication device by way of a base station that utilizes a cordless phone protocol and a wireless data protocol to provide voice and data communications to the first communication device.

17. The method of claim 14, comprising restoring a presentation of an original user interface presented on the first display responsive to a determination that the first communication device is not communicatively coupled to the second communication device.

18. The method of claim 14, comprising: detecting the presence of the second communication device, wherein the presentation of an original user interface at the first display device is restored responsive to detecting that the first communication device is not communicatively coupled to the second communication device.

19. The method of claim 14, comprising:
receiving a restoration request; and
restoring a presentation of an original user interface presented on the first display responsive to the restoration request.

20. The method of claim 14, wherein the operating characteristics comprise a frame rate.

* * * * *